United States Patent [19]

Lammers et al.

[11] Patent Number: 5,329,286
[45] Date of Patent: Jul. 12, 1994

[54] METHOD FOR TWO DIMENSIONAL DOPPLER IMAGING OF RADAR TARGETS

[75] Inventors: Uve H. W. Lammers, Chelmsford; Richard A. Marr, N. Billerica, both of Mass.

[73] Assignee: The United States of America as represented by the Secretary of the Air Force, Washington, D.C.

[21] Appl. No.: 86,078

[22] Filed: Jun. 29, 1993

[51] Int. Cl.[5] .............................................. G01S 7/40
[52] U.S. Cl. .................................................... 342/165
[58] Field of Search ............... 342/165, 169, 171, 109, 342/107

[56] References Cited

U.S. PATENT DOCUMENTS

| | | | |
|---|---|---|---|
| 4,527,161 | 7/1985 | Wehner | 343/16 M |
| 4,562,439 | 12/1985 | Peralta et al. | 343/17.1 R |
| 4,768,156 | 8/1988 | Whitehouse et al. | 364/521 |
| 4,855,747 | 8/1989 | Steinberg | 342/179 |
| 4,910,523 | 3/1990 | Huguenin et al. | 342/179 |
| 5,075,681 | 12/1991 | Kartiala | 342/165 |
| 5,140,331 | 8/1992 | Aulenbacher et al. | 342/165 |

Primary Examiner—Mark Hellner
Attorney, Agent, or Firm—Donald J. Singer; Irwin P. Garfinkle

[57] ABSTRACT

A method for two dimensional imaging of a two or three dimensional target is disclosed. As shown, a radar transmitter transmits a beam on a beam axis originating at a position spaced from the target and a radar receiver receives return signals from the target. The stationary radar observes the precessing target whose normal to the two dimensional target plane (or whose axis through a three dimensional target) intersects the transmitted beam axis at a point, and forms a cone half angle with the beam axis. With the normal (or target axis) moving along a conical surface while precessing 2 Pi around the beam axis, signal returns from the target are processed to develop a two dimensional image of the target. The process is repeated at other cone half angles and a composite, reduced-sidelobe image generated by vectorial superposition of images at multiple cone half angles.

13 Claims, 4 Drawing Sheets

METHOD FOR TWO DIMENSIONAL DOPPLER IMAGING OF RADAR TARGETS

STATEMENT OF GOVERNMENT INTEREST

The invention described herein may be manufactured and used by or for the Government for governmental purposes without the payment of any royalty thereon.

This invention is used to develop radar images of captive objects such as full-size or scale model airplanes. It assumes a captive target which is subjected to precessional motion akin to that of a spinning mechanical top, with the precession axis pointing along the beam axis of a stationary radar. Unlike the prior art, where two dimensional radar images in a plane parallel to the beam direction and based on Doppler spectral shift require that a captive target rotates around an axis perpendicular to the radar beam direction, the Doppler derived images of this invention use a unique form of target motion (precession) to develop a two-dimensional radar image in a plane orthogonal to the radar beam direction. This method of two dimensional Doppler imaging is quite generally applicable to radar, if the targets can be made to move in the unique precession described herein. This is possible for full-size and scaled targets supported by appropriate positioners on radar scattering ranges, and may even be possible to some extent for targets moving operationally, such as an aircraft in flight.

BACKGROUND OF THE INVENTION

Radar images of composite targets tend to be quite different from their visual counterparts. Since directional illumination is used and since target surfaces are fairly smooth in terms of wavelengths, only a small number of regions on the target reflect in the radar direction at any particular target orientation. The radar image appears to be composed of a finite number of point scatterers in contrast to the visual image, which is continuous over the object surface. In general radar targets are three dimensional, hence, the distribution of point scatterers is three dimensional.

Imaging is one method of target identification by radar. Of all available methods it carries the highest information content. Although a radar image comparable to the visual image is desirable, there are limits to achieving this. Due to the much lower target-size-to-wavelength ratio at radar wavelengths, and due to the more specular nature of radar echoes, a radar image will, at best, crudely approximate the visual image and generally require interpretation or comparison with known radar images of that target for identification. Radar images are typically, but not exclusively, two dimensional views of a target where the two dimensions are range (resolvable by radar bandwidth) and cross-range (resolvable by Doppler spectral shift). This assumes that the target rotates around an axis perpendicular to the radar beam direction. The radar image plane contains the radar beam direction. This is in contrast to a visual image, which is orthogonal to the viewing direction, assuming that the target produces a two dimensional silhouette-type image. In the invention described here we use a unique form of target motion to develop a two dimensional radar image in a plane orthogonal to the radar beam direction. This image is of the visual type. Its resolution depends on the radar frequency but not on its bandwidth.

A state-of-the-art account of "High Resolution Radar Imaging" can be found in a book of that title by Dean L. Mensa, published by Artech House Inc., Dedham, Mass. Described herein (with respect to FIG. 1) is a method disclosed by Mensa for range/crossrange imaging with a single-wavelength radar, which will illustrate some general principles and which is related to this invention. The Mensa method is published under the title "Aperture Synthesis by Object Rotation in Coherent Imaging", IEEE Transactions on Nuclear Science, Vol. NS-27, No. 2, pp 989-998, April 1980. Mensa teaches that a CW radar can generate two dimensional images of a captive target which rotates around an axis perpendicular to the radar beam direction.

SUMMARY OF THE INVENTION

In summary, this invention describes imaging by a single wavelength stationary CW radar of a composite captive target with multiple scattering centers. Doppler information due to the target's precessional motion yields a two dimensional image. Only a limited range of aspect angles on the target is required, thus alleviating the need for axially symmetrical scatterers.

BRIEF DESCRIPTION OF THE DRAWINGS

The advantages, objects and features of the invention will become more apparent after considering the following description taken in conjunction with the illustrative embodiment in the accompanying drawings, in which.

DESCRIPTION OF MENSA'S PRIOR ART METHOD

Figure 1:
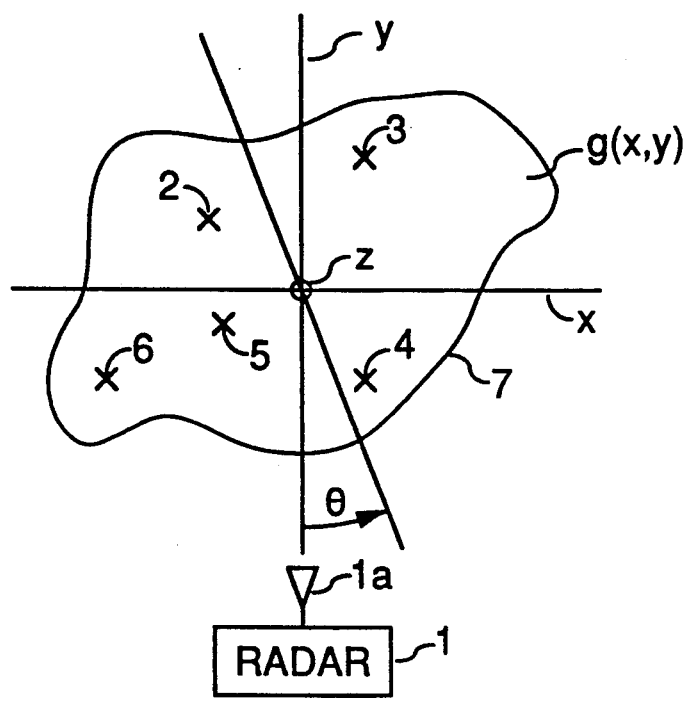
FIG. 1 is a view showing the Mensa prior art method of radar imaging.
Figure 1A:
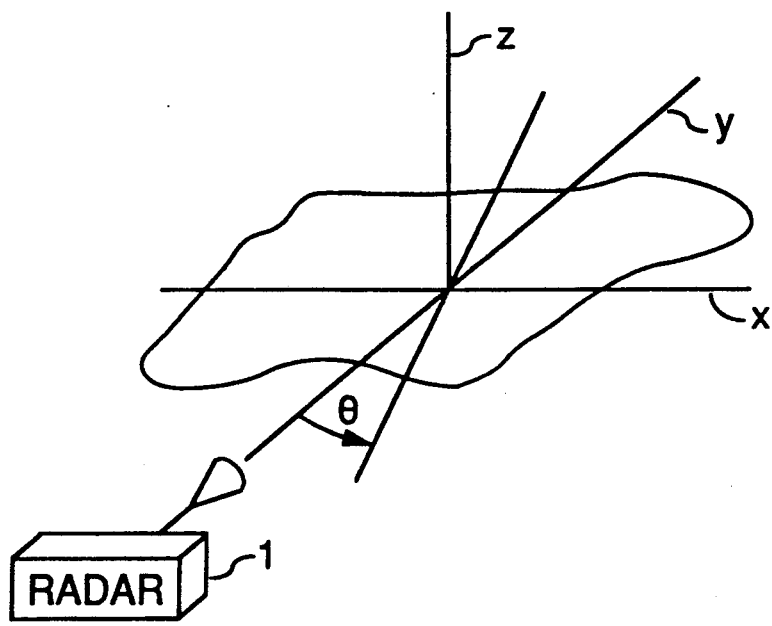
FIG. 1a is a perspective view of the radar and target scene as shown in the prior art method of FIG. 1.
Figure 2:
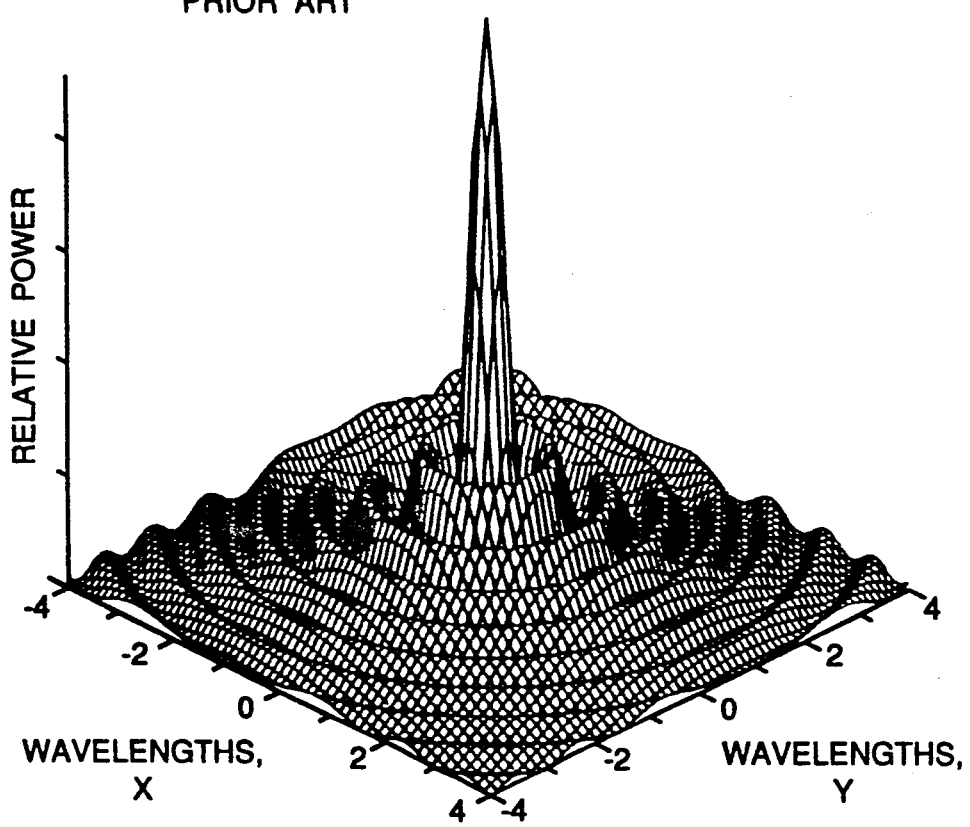
FIG. 2 shows the image of a point scatterer of the prior art method of FIG. 1.

Referring to the prior art of Mensa as depicted in FIGS. 1, 1a and 2, consider the problem of obtaining a two dimensional image of a two dimensional target by processing reflected signals using a radar located in the target plane. As shown in FIG. 1, target 7 and radar 1 are in each other's far field. That is, wave fronts arriving at the target 7 are plane, and reflected wavefronts arriving at the radar antenna 1a are plane. In accordance with Mensa, the target 7 is rotated in fixed angular increments around a z-axis which is perpendicular to the plane of target 7. Assuming that the target 7 contains discrete scattering centers 2 through 6, the signals reflected from these scattering centers constitute a phasor sum at the radar, whose amplitude and phase changes with every increment of target rotation around the z-axis. More generally, it may be the case that the target consists of distributed scattering centers described by a reflectivity density function g(x,y) rather than discrete scattering centers a shown in FIG. 1. The objective is to determine the reflectivity density function g(x,y), which represents the target's image, from the sequence of voltage vectors G(θ), measured at the radar as the target is rotated in even angular θ-increments, once completely around its z-axis (0≦θ≦2 Pi). Mensa showed that this can be done by inverse two dimensional Fourier transform. For the case of a monochromatic radar of wavelength L the two dimensional integral can be reduced to a one dimensional integral, if a transformation from the Cartesian x,y coordinate system in FIG. 1 to a polar r,Ψ coordinate system is first introduced. With x=r sin Ψ and y=−r cos Ψ, Mensa derived as his Equ (4–7) in his book $$g(r, \Psi) = 2L^{-1} \int_0^{2Pi} G(\theta)\exp[-j4PirL^{-1}\cos(\theta - \Psi)]d\theta.$$

Here g(r,Ψ) is the same reflectivity density function as before, expressed in polar coordinates. To determine target reflectivity at point r,Ψ or the corresponding point x,y, one integrates the complex function over the full θ range from 0 to 2 Pi. Since measurements were taken at discrete angular steps θ, the integration is carried out numerically by computer. Target reflectivity at other r,Ψ or x,y locations are then determined by repeating the integration over θ at these locations. When all r,Ψ locations of the target field have been evaluated, the two dimensional image of the target is complete. Due to the single-wavelength measurement, a pointlike scattering center does not result in a point image, but rather has a point spread function associated with it. Such a point spread function is shown in FIG. 2. A pointlike scattering center produces a main lobe of finite width with sidelobes surrounding the main lobe, the largest sidelobe being only 8 dB below the main lobe. In a target with multiple or distributed scattering centers, sidelobes add up. With increasing numbers of scattering centers and particularly with closely spaced scattering centers of different amplitudes, main lobes will eventually drown in the composite sidelobes.

Despite the fact that the Mensa method makes possible two dimensional imaging with a single-wavelength radar, there are severe drawbacks. The technique is limited to a small number of scattering centers of similar amplitude to avoid the mentioned sidelobe problem. It is also limited to scattering centers scattering isotropically in the plane of measurement, since constant amplitude reflections must be obtained for angles θ covering 0 to 2 Pi for it to work. Small incrementation is necessary for a large target, with the constraint that at its extreme radius the target does not rotate more than corresponds to a radar signal phase shift of Pi per θ-increment to meet the Nyquist sampling requirement. Multiple scattering centers will shadow each other during parts of the 2 Pi rotation.

The sidelobe problem is alleviated by measuring at more than one wavelength. Sidelobe periodicity changes with wavelength. By superimposing these measurements, sidelobes cancel partially. The requirement for isotropic scattering in the plane of measurement makes necessary scattering centers of axial symmetry such as cylinders or spheres, a severe constraint.

DESCRIPTION OF THE PREFERRED EMBODIMENT

Figure 3:
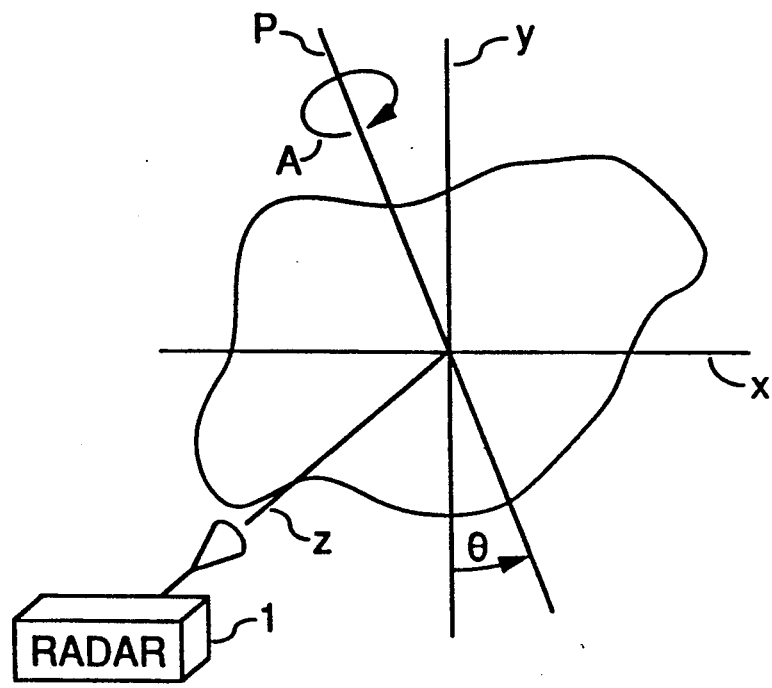
FIG. 3 illustrates in a perspective view the present method which involves a two dimensional target in a plane orthogonal to the radar beam direction.
Figure 4:
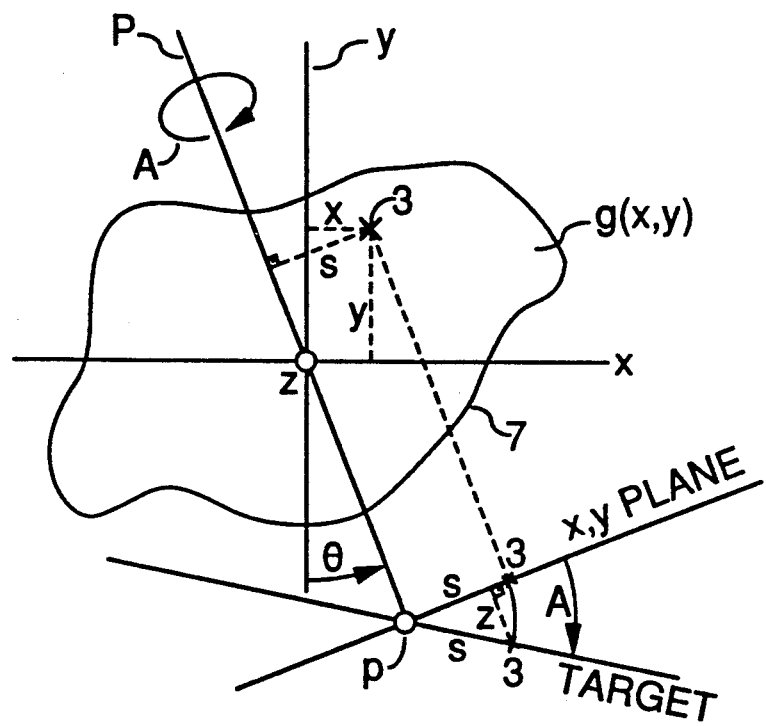
FIG. 4 shows the target plane of FIG. 3 and a plane orthogonal to it, folded into the target plane to demonstrate target precession.

The method of this invention, as depicted in FIGS. 3 and 4 involves a two dimensional target in the x,y plane, which is orthogonal to the radar beam direction, rather than being located in the same plane as taught by Mensa. Also, the target no longer rotates around the z-axis. Instead, it rotates around a tilt axis p by an angle A as shown in FIGS. 3 and 4. Except for scattering centers along the p-axis, the target leaves the x,y plane. The tilt axis p is rotated itself in the x,y plane in increments θ throughout the range 0 to 2 Pi. At each θ position of the p-axis the target is tilted by the same angle A. Note, that this axis p of target tilt, not the target itself, rotates around the z-axis. Scattering centers distributed on the surface of the target thus return component signals to the radar for a fixed angle A, whose phase changes with the direction of the p-axis and with their specific x,y location on the target. FIG. 4 shows the target plane and the plane orthogonal to the p-axis, in which angle A is measured. The latter is folded into the target plane. The figure allows one to determine the displacement z of a scattering center 3 at location x,y as a function of angles θ and A. From trigonometry it follows that $$z = -\sin A\ (x \cos \theta + y \sin \theta).$$

In FIG. 4, the angle A has been rotated into the x,y plane for inspection. Displacement z is a direct measure of the phase shift that the signal from scattering center 3 undergoes.

It can be shown that the Fourier transformation of the phasor sequence G(θ) to determine g(r,Ψ) or g(x,y) is identical to the one described in Mensa with the exception of a constant factor sinA, which appears twice.

$$g(r, \Psi) = 2(\sin A)L^{-1} \int_0^{2Pi} G(\theta)\exp[-j4Pir(\sin A)L^{-1}\cos(\theta - \Psi)]d\theta.$$

This is to say, by positioning the plane of scatterers orthogonal to the radar beam direction and measuring the sum phasor G(θ) while sequentially tilting the target around the p-axis by a fixed angle A, one can reconstruct the reflectivity density function g(x,y). The constant factor $L^{-1}$ in the case of the prior art FIG. 1a is now replaced by $(\sin A)L^{-1}$ in FIG. 3 in both places where it appears in the integral equation. In the prior art case it had been stated that to suppress sidelobe buildup in the image, one had to change the wavelength for a change in sidelobe periodicity. This invention makes possible the same smoothing by changing angle A and leaving wavelength L constant. This is much simpler in many radars and therefore of great benefit. Actually, many radars are incapable of a frequency change all together. As before, g(x,y) is determined for one fixed angle A, while θ rotates over 2 Pi. This is then repeated for n−1 other fixed values of angle A. The resultant $$g(x, y) = 1/n \sum_{i=1}^{n} g_{A_i}(x, y)$$

is obtained by adding the complex $g_{A_i}(x,y)$ for all n values of $A_i$ and normalizing by multiplication with 1/n. Depending on the number of $A_i$ values and their angular spacing, substantial smoothing of the image can be achieved.

The method of two dimensional crossrange imaging according to FIG. 3 has substantial advantages over Mensa's method of FIG. 1 and 1a, and other known methods as found in the current literature on the subject. 1) A high quality two dimensional crossrange image can be generated with a single-wavelength radar. 2) The radar aspect angle of the target is the same as the visual aspect angle of the target (silhouette). 3) For an image from a specific aspect angle the target does not change its direction by more than some maximum angle Amax relative to the radar beam direction over the whole $\theta$-range of 2 Pi. This means that the target does not have to be an isotropic radiator over an angular range of 2 Pi. Rather, it need only reradiate isotropically over an angular range $\pm$Amax. In other words, the value of angle Amax is chosen such that the angular pattern of the target reflected signal always includes the radar antenna while $\theta$ changes between 0 and 2 Pi. At a given wavelength L the beamwidth of the reflected signal decreases proportional to target size. This makes necessary a corresponding decrease in Amax. While the point spread function widens inversely proportional to Amax, the relative resolution remains constant with increasing target size. 4) Since for a small angle A, the target rotates only over a small angle relative to the linear polarization vector of the radar signal, polarization dependence of the target return signal is minimized. 5) There is no shadowing of scattering centers of a two dimensional target during the $\theta=2$ Pi rotation of the p-axis. 6) A sequence of measurements at different angle A, which are much easier to implement than frequency changes, leads to substantial image sidelobe suppression.

Target simulation is used to demonstrate the validity of this new imaging method, and to illustrate the sidelobe smoothing achievable by averaging measurements taken with different values of angle A.

Figure 5:
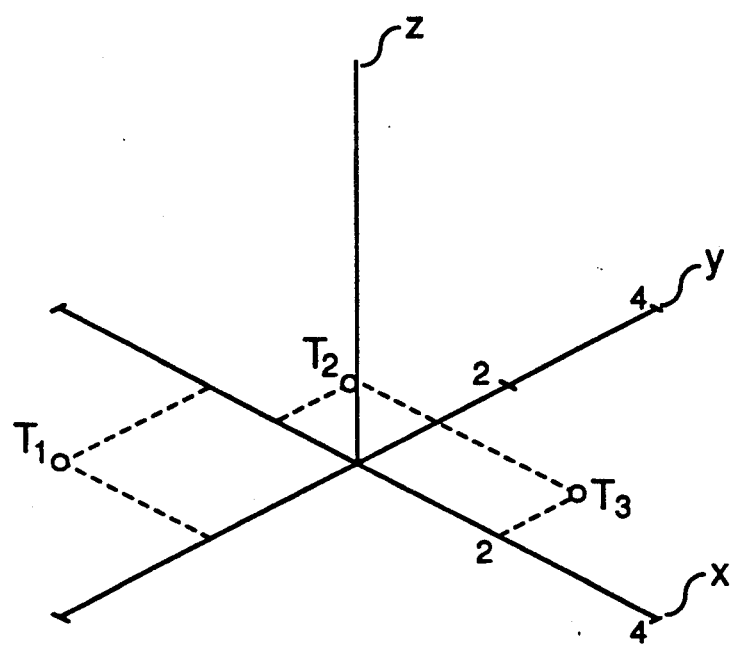
FIG. 5 shows three point targets located at x,y positions in the x,y target plane.

Assume that three point targets are located at the x,y positions shown in FIG. 5. The first target is located at $x=-2$, $y=-2$, the second target at $x=-1$, $y=1$, and the third target at $x=2$, $y=1$. We normalize the target field in wavelengths, so that the following results become independent of wavelength. Thus, the target field of eight by eight wavelengths shown in FIG. 5 has the first target at $x=-2$ wavelengths, $y=-2$ wavelengths and so on. Next we calculate the sum vector $G(\theta)$ as it is received by the radar. This is done by determining trigonometrically the distances of all three targets from the radar antenna, converting them to phase of each target vector, and adding the three vectors together. The numeric integration of the reflectivity density function $g(x,y)$ given above then yields the results shown in FIGS. 6 and 7.

Figure 6:
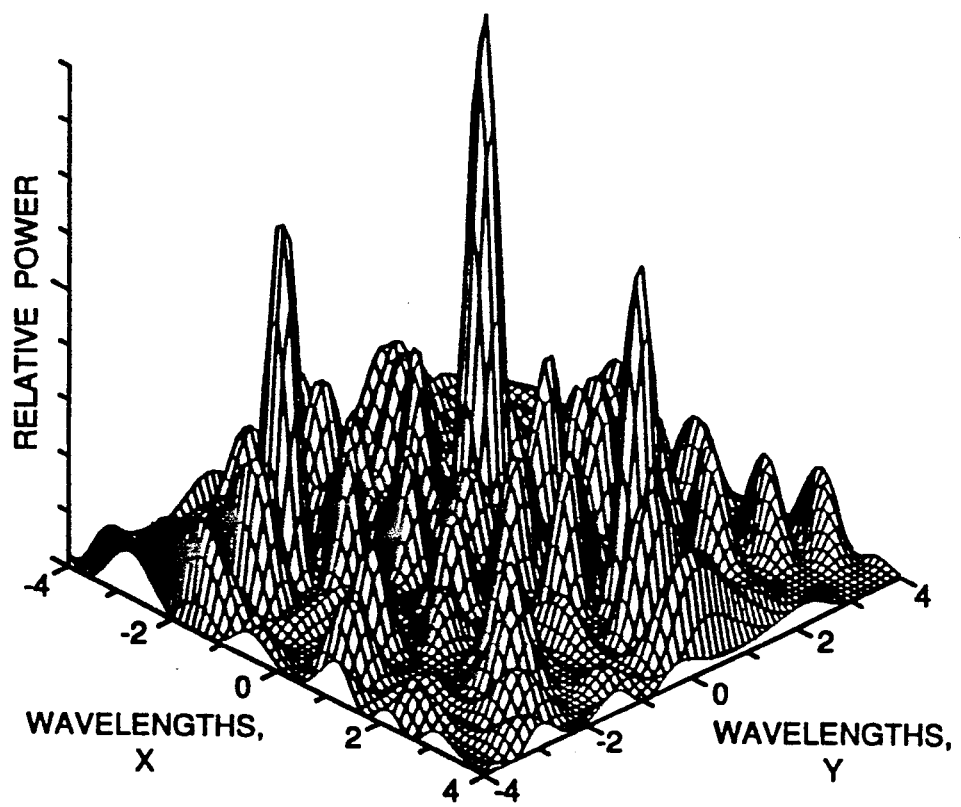
FIGS. 6 and 7 demonstrate the results of sidelobe level reduction on the image generated from FIG. 5.
Figure 7:
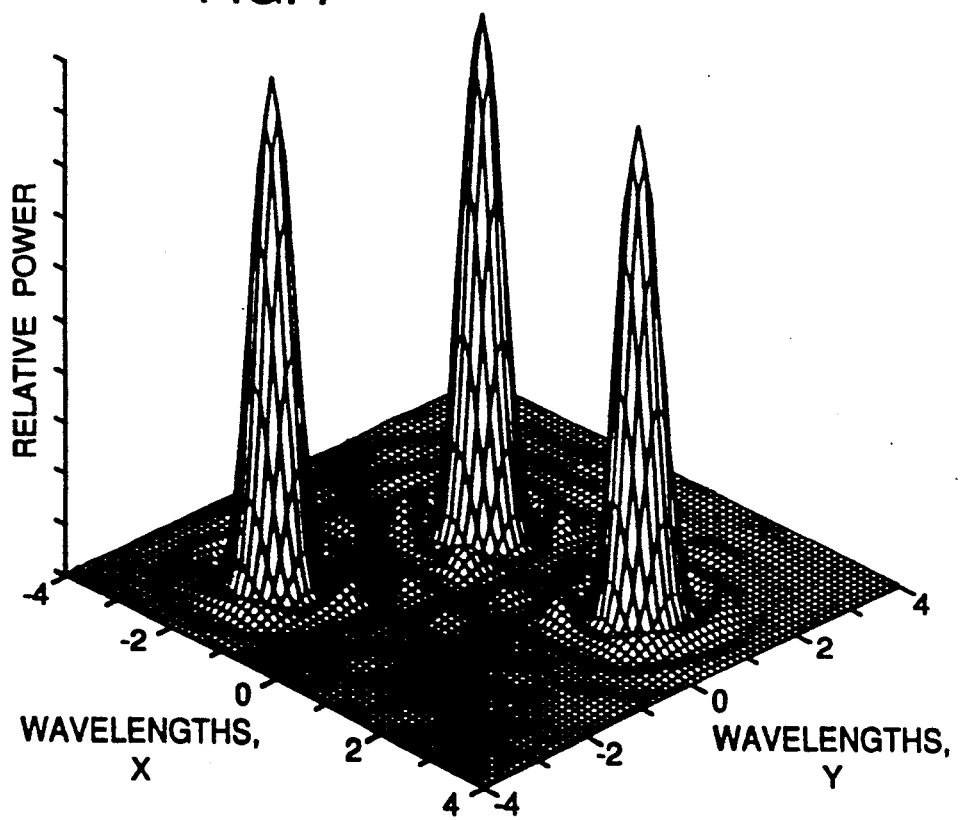

In FIG. 6 we chose angle A=20 deg. Relative power or $g(x,y)$ is displayed in z-direction. All three targets are chosen to produce equal power signals at the radar antenna. What is seen in FIG. 6 is the superposition of the three point spread functions of the three point targets, with the sidelobes practically obscuring the targets. In FIG. 7 a total of eight images are superimposed vectorially to demonstrate sidelobe suppression. The largest angle Amax is 20 deg as in FIG. 6. The seven additional images are based on angles A such that the sinA range from 0 to sin 20 is covered in equal increments.

In essence, we have provided a method of radar imaging a planar target with a radar transmitter and receiver by transmitting a beam originating from a position spaced from the target plane. The axis of the transmitted beam is centered on the target and is normal to it. The target is then precessed relative to the beam axis by causing the normal to the target plane to describe the conical surface of a cone around the beam axis with the apex of the cone at the point where the beam axis intersects the target plane. The return signals are then processed to develop an image of the target.

This image consists of a two dimensional raster of points where, at each point, a magnitude is plotted representing the strength of the signal returned from the corresponding point on the target. To determine the magnitude to plot at each raster point, the progression of signal phase is computed for each precessing raster point from the radar distance between that raster point and the transmitter/receiver location. The hypothetical signal from each raster point is assigned a unit magnitude and is correlated with the measured composite signal from the target over the precession angular interval of 2 Pi. The magnitude of the correlation factor at each raster point is plotted at that raster point. The raster of correlation magnitudes constitutes the image of the target.

It is noted that the normal to the target plane establishes a fixed cone half angle with the transmit beam axis, and it is precessed 2 Pi around the beam axis without target rotation, the normal thereby describing the full conical surface of a cone. The set of complex voltage vectors $G(\theta)$ acquired during the 2 Pi precession are processed into an image $g(x,y)$ for this cone half angle. Other sets of $G(\theta)$, taken at different cone half angles are processed into different images $g(x,y)$. All these images $g(x,y)$ are then vectorially added to yield the composite image with suppressed sidelobes.

It is also noted that the process applies to a three dimensional target as well, with some axis through this target chosen to precess around the beam axis like the normal of a planar target described earlier. For small cone half angles the image generated is a projection of the three dimensional target onto the plane orthogonal to the chosen target axis.

The method applies to the transmission of CW signals, with distinction between the transmitted and target reflected signals being achieved by the receiver through the phase shift imposed by the precessing target on the reflected signals. The method also applies where the transmitted signal is a pulsed CW signal, with distinction between the transmitted and target reflected signal being achieved by the receiver through timing.

Stated yet another way, we provide a radar imaging method wherein a two or three dimensional target is illuminated with a stationary radar beam, while precessing the target normal along conical surfaces of different half cone angles around the beam axis. The received return signals comprised of contributions from all scatterers on the target are then processed into individual images for each cone half angle, from which the final image is derived by vectorial superposition of the images at all half cone angles.

Clearly, many modifications and variations of the present invention are possible in light of the above teachings and it is therefore understood, that within the inventive scope of the inventive concept, the invention may be practiced otherwise than specifically described.

What is claimed is:

1. A method of radar imaging a planar target with a radar transmitter and receiver, said radar transmitter transmitting a beam originating from a position spaced from a target plane, said radar receiver receiving return signals from said target, said radar imaging method comprising the steps of:

transmitting said beam toward said target to illuminate said target, said target being centered on the axis of said beam;

precessing said target relative to said beam axis by causing the normal to the target plane to describe the conical surface of a cone around the beam axis with the apex of the cone at the point where the beam axis intersects the target plane; and processing said return signals from said target to develop a two dimensional image thereof.

2. The method of claim 1, wherein said normal to the target plane establishes a fixed cone half angle with said beam axis, said normal precessing 2 Pi around said beam axis without target rotation, said normal thereby describing the full conical surface of a cone.

3. The method of claim 2, where said target plane normal is precessed in discrete angular steps over 2 Pi, and wherein said return signals are processed at each discrete step to provide a two dimensional image of said target.

4. The method of claim 3, and repeating said steps with a different cone half angle between said normal and said beam axis.

5. The method of claim 4, said radar receiver receiving different return signals from said target, and processing said different return signals to develop a different two dimensional image thereof.

6. The method of claim 4, wherein multiple sets of return signals acquired at multiple cone half angles are processed to develop multiple images of said target.

7. The method of claim 6, and vectorially summing said multiple images to provide a composite image of said target.

8. The method of claim 7, where the image plane of said target represents a two dimensional raster of points and where the progression of received signal phase is computed for each precessing raster point from the radar distance between each raster point and the transmitter/receiver location.

9. The method of claim 7, where the correlation factor between the sum signal from a composite target consisting of multiple scattering centers and a unit-magnitude signal from each image plane raster point is computed over the 2 Pi precession of the target normal around the beam axis, resulting in a two dimensional image of said target when plotting the correlation factor of said received sum signal and each raster point signal at said raster point; and repeating said steps for all raster points in said image plane.

10. The method of claim 7, where said target is three dimensional, with one axis through said target precessing around said beam direction, said target axis taking the place of said target plane normal.

11. The method of claim 10, generating a two dimensional image of said three dimensional target for small cone half angles, said image being a projection of the three dimensional target onto a plane orthogonal to said target axis.

12. The method of claim 7, wherein the transmitted signal is a CW signal, with distinction between the transmitted and target reflected signals being achieved by the receiver through the phase shift imposed by the precessing target on the reflected signals.

13. The method of claim 7, the transmitted signal being a pulsed CW signal, with distinction between the transmitted and target reflected signal being achieved by the receiver through timing.

* * * * *